United States Patent [19]

Hansson et al.

[11] 4,312,739

[45] Jan. 26, 1982

[54] MEDIUM FOR ISOELECTRIC FOCUSING

[75] Inventors: Hasse A. Hansson; Sven L. Kågedal, both of Uppsala, Sweden

[73] Assignee: Pharmacia Fine Chemicals, AB, Uppsala, Sweden

[21] Appl. No.: 192,295

[22] Filed: Sep. 30, 1980

[30] Foreign Application Priority Data

Oct. 11, 1979 [SE] Sweden ............................... 7908454

[51] Int. Cl.³ .......................................... G01N 27/26
[52] U.S. Cl. .......................... 204/299 R; 204/180 G; 252/315; 252/316; 536/2; 536/52
[58] Field of Search ........................... 204/180 G, 299; 252/315, 316; 536/2, 52, 1; 195/68

[56] References Cited

U.S. PATENT DOCUMENTS

| | | | |
|---|---|---|---|
| 3,527,712 | 9/1970 | Renn et al. ............... | 204/180 G X |
| 3,836,433 | 9/1974 | Wirth et al. .................... | 195/68 |
| 3,873,514 | 3/1975 | Chu et al. .......................... | 536/2 X |
| 3,956,272 | 5/1975 | Tixier .................................. | 536/2 X |
| 3,956,273 | 5/1976 | Guiseley ............................. | 536/2 X |
| 3,959,251 | 5/1976 | Porath et al. ....................... | 536/2 X |

Primary Examiner—Arthur C. Prescott
Attorney, Agent, or Firm—Fred Philpitt

[57] ABSTRACT

A medium for isoelectric focusing is produced which consists of or contains agarose into which positively charged substituents have been introduced to neutralize negatively charged groups inherently present in the agarose, said substituents containing as the only charged group a quaternary amino group with a positive charge independent of pH at least in the range 2–12. The medium may consist of a mixture of two or more agarose preparations with different degrees of substitution with regard to the introduced substituents. Unmodified agarose may also constitute one of the components of the medium.

4 Claims, No Drawings

MEDIUM FOR ISOELECTRIC FOCUSING

The present invention relates to a medium for isoelectric focusing, which medium is based on agarose.

An important area of use of the medium according to the invention is as anti-convection medium or stabilizing medium in analytical isoelectric focusing. At present the predominant medium for this type of isoelectric focusing is cross-linked polyacrylamid (polyacrylamide gel). It affords stable pH gradients and excellent separation of proteins but it also has some important drawbacks. The procedure for the preparation of the polyacrylamide gel is laborious and includes the use of very toxic chemicals. Another draw-back is that the polyacrylamide gel consists of so tight a net-work of polymer chains that the migration of the proteins in the electrical field is retarded and large proteins with molecular weights above 100,000 can not as a rule be focused because of the small size of the meshes.

Agarose has been proposed as an alternative to the polyacrylamide. However, agarose contains negatively charged groups, mainly sulphate ester groups and carboxyl groups (with positive counter ions such as alkaline metal ions, e.g. sodium or potassium ions, or ions of organic amines), which causes the so called electroosmosis, i.e. a flow of liquid through the gel. This causes the position of the pH gradient of move continously in the gel and eventually the gradient will degrade completely. Very often parts of the gel become dried out and collapse due to the electroosmosis.

It has been suggested that agarose gels suitable for isoelectric focusing can be prepared by purification or chemical modification using various methods or by using polymeric additives to increase the viscosity in order to reduce the electroosmotic flow, see for example Johansson, BG and Hjerten, S, Anal. Biochem. 59 (1974) 200, Weise, H-Ch and Grässlin, D, Acta Endocrinol. Suppl. 82 (1976) 75, and Grubb, A, Anal. Biochem. 55 (1973) 582 and the corresponding lecture abstract in Proceedings of the Twenty-First Colloquium on Protides of the Biological Fluids, Brügge, 1973, p. 649, (ed H Peters, Pergamin Press, 1974). The proposed purification and modification methods have, however, not resulted in complete elimination of the electroosmosis problem and the same holds also for the addition of polymers, which also reduces some of the advantages of agarose.

According to the present invention it has now been demonstrated that the net charge of the agarose matrix can be modified by the introduction of positively charged groups of a type which renders the agarose very suitable for use in isoelectric focusing.

The medium according to the invention is characterized in that it consists of or contains agarose into which positively charged substituents have been introduced to the neutralisation of negatively charged groups present in the medium, said substituents containing as the only charged group a quaternary amino group and the charge of said substituents being independent of pH at least in the range 2-12.

The substituents are according to a preferred embodiment of the medium according to the invention bound to the agarose via an ether or carboxylic acid ester linkage involving the oxygen atom of a hydroxyl group of the agarose.

Preferably the substituents do not contain other nitrogen atoms than those of the quaternary amino groups.

Inorganic or organic negative ions, e.g. chloride ions, nitrate ions, sulphate ions or negative ions of organic acids, can be chosen as counter ions to the above mentioned quaternary amino groups. The negative ionic groups present in the agarose itself can also serve as counter ions.

According to a particularly preferred embodiment of the medium according to the invention the positively charged substituents introduced into the agarose matrix are those of the formula

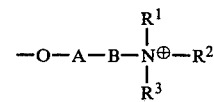

wherein $R^1$, $R^2$, $R^3$ are equal or different, and each represents an alkyl group containing 1–5 carbon atoms, a hydroxyalkyl group containing 2–5 carbon atoms, an aryl or an aralkyl group containing 1–5 carbon atoms in the alkyl part, or $R^2$ may together with $R^1$ or $R^3$ and the quarternary nitrogen atom form a heterocyclic ring, which ring also can carry an oxygen atom in the ring separated from the nitrogen atom by two carbon atoms, A represents a single bond or a carbonyl group —CO—, and B is an alkylene chain containing 2–10 carbon atoms in the case of A representing a single bond and 1–10 carbon atoms when A represents a carbonyl group, which alkylene chain represented by B may be interrupted by one or more ether groups and may be substituted by one or several alkyl and/or hydroxyl groups, at most one heteroatom being bound to one and the same carbon atom in the chain, and wherein the oxygen atom (—O—) originates from a hydroxyl group in the agarose. (The term "heteroatom" refers to other atoms than carbon and hydrogen atoms.) The counter ions to the substituents of this general formula may be those mentioned above.

The benzene ring can be unsubstituted or substituted in cases, where $R^1$, $R^2$ and/or $R^3$ are representing an aryl or an aralkyl group. In the latter case the substituents will of course be of a type which fulfils the requirement for pH independent positive charges. Examples of such groups are alkyl and alkoxy groups containing 1–6 carbon atoms and hydroxyalkyl groups containing 1–6 carbon atoms.

The following groups are examples of substituents of the general formula given above:

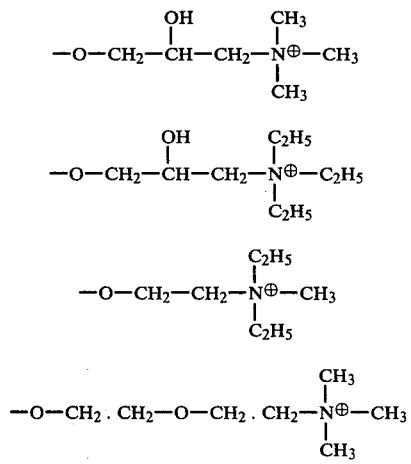

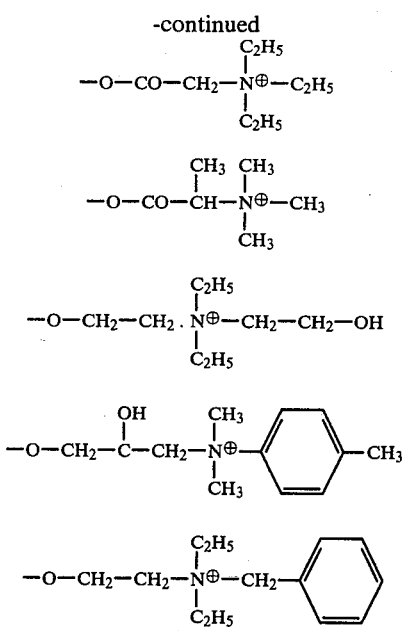

According to another aspect of the invention, the medium may consist of a mixture of two or more agarose preparations having different degrees of substitution with respect to the pH independent substituents. In this way a well functioning product may be achieved although the preparations by themselves can not be used with satisfactory results due to a too low or a too high degree of substitution. It is also possible to obtain a satisfactory product by mixing un-modified agarose with one or more substituted agarose preparations with a suitable degree of substitution.

When preparing mixtures of this type, the proportions of the components used are chosen so as to give the average degree of substitution needed to compensate the negatively charged groups present in the agarose.

The substituted agarose can be synthesized by methods previously used to introduce substituents in polysaccharides, e.g. via ether or carboxylic acid ester linkages. Ether linkages are preferred since such linkages are very stable. A hydroxyl group of the agarose can thus be reacted with a compound containing a quaternary amino group and a group capable of reacting with the hydroxyl group, for instance with an epoxide, a halogen hydrin or a reactive halogen compound in order to produce an ether linkage between the agarose and the substituent or with a carboxylic acid, a carboxylic acid halogenide or a carboxylic acid anhydride in order to produce an ester linkage between the agarose and the substituent. The reactions are carried out under conditions commonly used for the respective type of reaction. It is also possible to introduce a substituent carrying an amino group other than a quaternary group (preferably a tertiary amino group) as a first step, which amino group is then transformed into a quaternary amino group by known methods, e.g. by means of an alkyl halogenide or an epoxide (e.g. ethylene oxide or propylene oxide) or the corresponding halogen hydrin. It is also possible to introduce a substituent containing no amino group but carrying a reactive group which can be transformed into a quaternary amino group by being reacted with an amine by methods known per se. The average degree of substitution is chosen so that the positive charges of the substituents compensate for the negative charges occurring in the agarose.

Gels for isoelectric focusing can be prepared from the substituted agarose in the same way as agarose gels are prepared in other electrophoretic techniques, e.g. by allowing a warm solution of the modified agarose to set to a gel at a temperature below the gelling temperature. The addition of ampholyte necessary for the use in isoelectric focusing is preferably made to the warm solution before the casting of the gel. Ampholytes, currently employed in isoelectric focusing, can be used, e.g. with advantage ampholytes described in a German patent application, Offenlegungsschrift 2814408. As a rule it is of interest to use pH gradients in the 2.5-10.5 range, e.g. those obtained with ampholytes according to the above mentioned Offenlegungsschrift, e.g. for the pH intervals 3-10, 4-6.5, 5-8, 6.5-9 and 8-10.5.

One advantage of the modified agarose over polyacrylamide is that the preparation of a gel for isoelectric focusing is easier because of the elimination of the polymerization step and the handling of toxic chemicals. It is easy to repeat the casting of the gel using the same material, should the first attempt for some reason be less successful. This reduces the cost for ampholyte solution, which is the most expensive component in the gel for isoelectric focusing.

Another advantage is that the focusing is more rapid because of the higher porosity and the macroreticular structure. These properties also allow focusing of larger proteins in agarose than in polyacrylamide. Before the staining step the agarose is dried to a very thin film thereby permitting very rapid staining and destaining.

In comparison with in the literature described agaroses modified by substitution, the medium according to the present invention offers significant advantages since the substituents do not contain any other charges than those of the quaternary amino groups and the charges of the substituents are independent of pH at least in the interval 2-12. As a result of this a more stable pH gradient can be maintained over a wide pH interval.

The prior art medium according to Grubb (vide above) is obtained by reacting agarose with cyanogen bromide and (2-aminoethyl)-trimethylammonium bromide hydrobromide which leads to the introduction of not only quaternary amino groups but also other charged groups, the charges of which are not independent of pH over the whole range 2-12 (cf. page 591 of the reference).

The invention will in the following be illustrated by a number of working examples.

EXAMPLES ILLUSTRATING THE PREPARATION

Example 1

Synthesis

An aqueous solution (volume, see table below) containing 62 g of (3-chloro-2-hydroxypropyl)-N,N,N-trimethylammonium chloride per 100 ml solution was added to a mixture of ethanol (160 ml), water (20 ml), 2 M sodium hydroxide (12 ml), sodium borohydride (0.2 g) and agarose (40 g) with stirring at 45° C. The mixture was stirred at the same temperature for 20 h. Concentrated hydrochloric acid was then used to adjust pH to ca. 6.0. The product, i.e. agarose carrying substituents with the formula

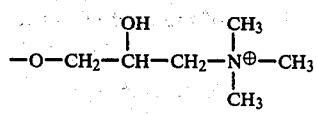

with chloride ion as counter ion, was washed with water on a glass filter and lyophilized.

The table below shows the amount of quaternary amine used and analytical results.

| Product code | Volume of amine solution (ml) | Nitrogen content of product (ppm) |
|---|---|---|
| 1A | 1.0 | 725 |
| 1B | 0.9 | 667 |
| 1C | 0.8 | 548 |

Casting of gel for isoelectric focusing

Modified agarose (0.3 g) and sorbitol (1.5 g) were dissolved in water (30 ml) by heating to boiling. Ampholyte (1.9 ml) for isoelectric focusing within the interval pH 5-8 and manufactured according to German Offenledungsschrift 2814408 (Pharmalyte ®5-8 from Pharmacia Fine Chemicals AB, Uppsala Sweden) was added and the solution was then immediately poured onto a sheet of plastic film (GelBond ®, Marine Colloid Inc., Springfield, N.J., USA) (110×225 mm). The solution set to a gel on the film. It was stored in a humidity chamber over night before use.

Example 2

The synthesis and the casting of the gel was performed as described in Example 1 except that the quaternary ammonium compound used was N-glycidyl-N,N,N-trimethylammonium chloride (G-MAC). Agarose containing groups of the formula given in Example 1 was obtained. The amount of G-MAC used and analytical results are given in the following table:

| Product code | Amount of G—MAC used (g) | Nitrogen in the product (ppm) |
|---|---|---|
| 2A | 0.55 | 610 |
| 2B | 0.50 | 535 |

Example 3

The product according to example 2A was mixed with unsubstituted agarose in the ratio 28:2, whereafter a gel was cast as described in Example 1.

Example 4

Agarose (24 g) was dissolved in water (250 ml) by heating. To this solution 2 M sodium hydroxide (40 ml), sodium borohydride (0.5 g) and 1-chloro-2-diethylaminoethane hydrochloride (0.5 g) were added. After stirring of the solution at 50° C. for 16 h the agarose was precipitated with ethanol (2 l). Concentrated hydrochloric acid was used to adjust pH to 6 and the product was then washed with ethanol and finally with water and freeze-dried.

A mixture of the freeze-dried agarose derivative (5 g), ethanol (30 ml), water (10 ml), disodium carbonate (4 g) and methyl iodide (5 ml) was stirred at room temperature for 16 h. The resulting product, agarose containing groups of the formula

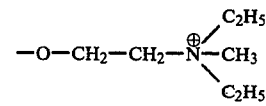

with iodide ion as counter ion, was then washed with 75% ethanol and finally with water.

This product was mixed with unsubstituted agarose in the ratio 17:13 and a gel for isoelectric focusing was cast as described in Example 1.

Example 5

Agarose (20 g), sodium hydroxide (24 g) and sodiumborohydride (1 g) were dissolved in water (600 ml) by heating to 60° C. Hydroquinone (0.2 g) and 3-bromopropene (3 ml) were added. The mixture was stirred at 60° C. for 4 h. The agarose product was precipitated with ethanol (2 l), washed with ethanol and then with water before lyophilization.

A solution of this product (2.5 g) in water (100 ml) was prepared by heating. After adjustment of pH of 5, bromine water was added to a weakly yellow colour. Triethylamine (10 ml) was added and the mixture was stirred for 22 h at 40° C. The agarose was precipitated with ethanol (500 ml) before adjusting pH to 5. The product, agarose containing groups with the formula

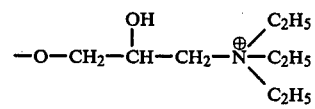

with bromide ion as counter ion, was washed with ethanol, and then with water and freeze-dried.

The product was mixed with unsubstituted agarose in the ratio 9:41 and a gel for isoelectric focusing was cast from this mixture using the procedure described in Example 1.

Example 6

Agarose (10 g), sodium hydroxide (10 g), sodium borohydride (1.0 g) and N-glycidyl-N,N,N-trimethylammonium chloride (G-MAC; amount, see below) were dissolved in water (500 ml) by heating. The solution was then stirred at 60° C. for 16 h. The agarose was precipitated with ethanol (ca. 600 ml). The product, agarose containing groups of the formula

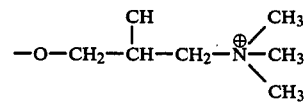

with chloride ion as counter ion, was washed with ethanol and then with water before drying in vacuum.

(A) Amount of G-MAC:0.1 g (B) Amount of G-MAC:2.0 g

Gels were prepared as in Example 1 from the products A and B separately and from a mixture of A and B in the ratio 41:9.

EXAMPLES ILLUSTRATING THE USE

Isoelectric focusing

EXAMPLE I

Isoelectric focusing using media synthesized according to Examples 1A–1C and 1:1 (w/w) mixtures of the media according to Examples 1B and 1C was carried out employing Flat Bed Apparatus FBE 3000 (Pharmacia Fine Chemicals AB, Uppsala, Sweden). The solutions used in the cathode and anode strips were 1 M NaOH and 0.05 M $H_2SO_4$ respectively. Test proteins (e.g. myoglobin, $\beta$-lactoglobuline, carbonic anhydrase, haemoglobin and plasminogen) were applied in the usual way. The focusing was carried out at a maximal power of 30 W and a maximal voltage of 1000 V during 2 h. A surface electrode was used to measure the pH in the gel after 1 h and 2 h and the pH gradient was plotted in a diagram with pH as a function of the distance in cm from the cathode. From the result it could be concluded that the products obtained in Examples 1A and 1B were overcompensated with respect to the negatively charged groups in the agarose and that the product according to example 1C was undercompensated whereas the mixture of the products of Examples 1B and 1C in the ratio 1:1 gave a stable pH gradient.

After focusing the proteins were fixed by immersing the gel into a bath of ethanol containing 10% trichloroacetic acid (w/w) and 5% 5-sulphosalicylic acid (w/w) for 30 min and then into ethanol for 5 min. The gel was then covered with 10 layers of paper towelling and a piece of glass upon which a weight of 2 kg was placed. The paper towelling was removed after 15 min and the gel was dried completely in a hot air stream.

The dried agarose gel was stained by immersion for 15 min in a 0.2% solution of Comassie-Brillantblau R 250 (Colour Index No. 42660; E Merck, Darmstadt, Germany) in a mixture of ethanol, acetic acid and water, 7:1:2. Excess dye was removed by washing in a mixture of ethanol, acetic acid and water, 7:1:2. After complete drying of the gel in a hot air stream the focused proteins appeared as distinct blue lines on a transparent, colourless film which could easily be filed.

EXAMPLE II

The focusing was carried out as in Example I except that products according to Examples 2A and 2B and a mixture of those products in the ratio 3:2 were used.

The results showed that the product according to Example 2A was overcompensated and that the one according to Example 2B was undercompensated whereas the mixture of the products gave a completely stable gradient.

EXAMPLE III

The focusing was carried out as in Example I except that an agarose medium according to Example 3 was used.

A completely stable pH gradient was obtained.

EXAMPLE IV

The focusing was carried out as in Example I except that an agarose medium according to Example 4 was used.

A completely stable pH gradient was obtained.

EXAMPLE V

The focusing was carried out as in Example I except that a medium according to Example 5 was used.

A completely stable pH gradient was obtained.

EXAMPLE VI

The focusing was carried out as in Example I except that products according to Examples 6A and 6B and a mixture of these products in the ratio 41:9 were used.

The results showed that the product according to Example 6A was undercompensated and that the product according to Example 6B was overcompensated whereas the mixture gave a stable pH gradient.

We claim:

1. A medium for isoelectric focusing based on agarose, wherein said medium consists of or comprises agarose into which positively charged substituents have been introduced to the neutralisation of negatively charged groups present in the medium, said substituents containing as the only charged group a quaternary amino group and the charge of said substituents being independent of pH at least in the range 2–12.

2. A medium according to claim 1, wherein said substituents are bound to the agarose via an ether or carboxylic acid ester linkage involving the oxygen atom of a hydroxyl group of the agarose.

3. A medium according to claim 1 or 2, wherein said medium consists of a mixture of at least two agarose preparations of different degrees of substitution with regard to the introduced substituents.

4. A medium according to claim 1 or 2, wherein said medium also comprises unmodified agarose.

* * * * *